United States Patent
Tong

(10) Patent No.: US 10,198,990 B2
(45) Date of Patent: Feb. 5, 2019

(54) DEVICE FOR TEMPERATURE DETECTION AND DEVICE FOR COMPENSATING FOR TEMPERATURE OF DISPLAY PANEL

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventor: Zhenxiao Tong, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/569,129

(22) PCT Filed: May 10, 2017

(86) PCT No.: PCT/CN2017/083772
§ 371 (c)(1),
(2) Date: Oct. 25, 2017

(87) PCT Pub. No.: WO2018/018991
PCT Pub. Date: Feb. 1, 2018

(65) Prior Publication Data
US 2018/0293937 A1 Oct. 11, 2018

(30) Foreign Application Priority Data

Jul. 25, 2016 (CN) .......................... 2016 1 0586140

(51) Int. Cl.
*G09G 3/3208* (2016.01)
*G09G 3/3225* (2016.01)
(Continued)

(52) U.S. Cl.
CPC .......... *G09G 3/3225* (2013.01); *G01K 7/015* (2013.01); *G09G 3/36* (2013.01);
(Continued)

(58) Field of Classification Search
CPC .................................. G01K 7/01; G01K 7/015
See application file for complete search history.

(56) References Cited

U.S. PATENT DOCUMENTS 4,384,262 A * 5/1983 Akita ..................... G01K 3/005
331/113 R
9,134,352 B2 9/2015 Huang et al.
(Continued)

FOREIGN PATENT DOCUMENTS

| CN | 103018531 A | 4/2013 |
| CN | 103377606 A | 10/2013 |

(Continued)

OTHER PUBLICATIONS

Search Report for International Patent Application No. PCT/CN2017/083772 dated Aug. 4, 2017.

*Primary Examiner* — Benjamin C Lee
*Assistant Examiner* — Dong Hui Liang
(74) *Attorney, Agent, or Firm* — Calfee, Halter & Griswold LLP

(57) ABSTRACT

A device and method for temperature detection, a device and method for compensating for temperature of display panel, and a display device are disclosed. The device for temperature detection includes: a first inverter, inverting a voltage signal at an input terminal thereof to output an inverted signal; a delay assembly, delaying the inverted signal and outputting a delayed inverted signal as an output signal; a switching transistor, applying a first voltage signal to the input terminal of the first inverter from a first voltage signal terminal based on the output signal; a first capacitor, includ- (Continued)

ing a first terminal coupled to a first electrode of the switching transistor and a second terminal coupled to the input terminal of the first inverter; and a temperature sensing transistor, configured so that a channel current of the temperature sensing transistor is proportional to a temperature at the sub-threshold bias voltage.

20 Claims, 6 Drawing Sheets

(51) Int. Cl.
  *G09G 3/36* (2006.01)
  *G01K 7/01* (2006.01)
(52) U.S. Cl.
  CPC ............ *G09G 2320/041* (2013.01); *G09G 2320/0673* (2013.01); *G09G 2330/021* (2013.01)

(56) References Cited

U.S. PATENT DOCUMENTS

| | | | |
|---|---|---|---|
| 9,647,661 B2 | 5/2017 | Cui et al. | |
| 2008/0143449 A1* | 6/2008 | Chung | G01K 7/01 331/66 |
| 2009/0096495 A1* | 4/2009 | Keigo | G01K 7/01 327/142 |
| 2014/0159998 A1 | 6/2014 | Huang et al. | |
| 2016/0149574 A1 | 5/2016 | Cui et al. | |

FOREIGN PATENT DOCUMENTS

| | | |
|---|---|---|
| CN | 103684354 A | 3/2014 |
| CN | 104361874 A | 2/2015 |
| CN | 104596659 A | 5/2015 |
| CN | 106023890 A | 10/2016 |
| KR | 20080060374 A | 7/2008 |

\* cited by examiner

DEVICE FOR TEMPERATURE DETECTION AND DEVICE FOR COMPENSATING FOR TEMPERATURE OF DISPLAY PANEL

CROSS-REFERENCE TO RELATED APPLICATIONS

The present application is based upon International Application No. PCT/CN2017/083772, filed on May 10, 2017, which is based upon and claims priority to Chinese Patent Application No. 201610586140.0, filed on Jul. 25, 2016, the entire contents of which are incorporated herein by reference.

TECHNICAL FIELD

The embodiments of the present disclosure relate to the field of display technology, and more particularly to a device and method for temperature detection, a device and method for compensating for temperature of a display panel, and a display device.

BACKGROUND

With the rapid development and application of mobile products, the demand for new electronic products is growing, and the display panel is developing rapidly. A flat panel display device with a light weight, a slim volume, a low power consumption and easy carrying, etc., has been widely used in the electronic products. A thin film transistor (TFT) as a display control unit plays an important role in the field of flat panel display (FPD) such as liquid crystal display (LCD), organic light emitting diode display (OLED), electronic paper display (EPD), and micro display.

Due to characteristics of liquid crystals and that operation stability of the OLED will drift with a change of temperature and electrical characteristics of the thin film transistor will change with temperature, a display effect will change when a temperature inside a display panel screen changes. In order to exhibit the same or similar display effect under different temperature conditions, it is necessary to compensate for the temperature of the display panel to reduce the drift of the display effect with temperature change. Therefore, there is a demand for continuously improving the temperature compensation effect of the display panel.

SUMMARY

The embodiments of the present disclosure provide a device and method for temperature detection, a device and method for compensating for temperature of a display panel, and a display device.

According to an aspect of the present disclosure, there is provided a device for temperature detection, including: a first inverter, configured to invert a voltage signal at an input terminal of the first inverter to output an inverted signal; a delay assembly, coupled to the first inverter, and configured to delay the inverted signal and to output a delayed inverted signal as an output signal; a switching transistor, including a control electrode coupled to the delay assembly, a first electrode coupled to a first voltage signal terminal and a second electrode coupled to the input terminal of the first inverter, and configured to apply a first voltage signal from the first voltage signal terminal to the input terminal of the first inverter based on the output signal; a first capacitor, including a first terminal coupled to the first electrode of the switching transistor and a second terminal coupled to the input terminal of the first inverter; and a temperature sensing transistor, including a control electrode applied with a sub-threshold bias voltage, a first electrode coupled to the input terminal of the first inverter and a second electrode is grounded to be coupled to a second voltage signal terminal, and configured so that a channel current of the temperature sensing transistor is proportional to a temperature at the sub-threshold bias voltage.

According to another aspect of the present disclosure, there is provided a device for compensating for temperature of a display panel, including: the device for temperature detection described above; a filtering assembly, configured to filter an output signal of the device for temperature detection; a converter, configured to convert a filtered output signal into a temperature code; and a power management assembly configured to adjust a drive voltage outputted to the display panel according to the temperature code.

According to another aspect of the present disclosure, there is provided a display device, including the device for compensating for temperature of a display panel described above.

According to another aspect of the present disclosure, there is provided a method for detecting temperature using the device for temperature detection described above, including: applying a high level signal to the first voltage signal terminal, applying a low level signal to the second voltage signal terminal, and applying the sub-threshold bias voltage to the control electrode of the temperature sensing transistor, to output, from an output terminal of the delay assembly, an output signal which is variable with temperature; filtering the output signal; converting a filtered output signal into a temperature code; and determining the temperature according to the temperature code.

According to another aspect of the present disclosure, there provides a method for compensating for temperature of a display panel, including: applying a high level signal to the first voltage signal terminal of the device for temperature detection described above, applying a low level signal to the second voltage signal terminal of the device, and applying the sub-threshold bias voltage to the control electrode of the temperature sensing transistor of the device, to output, from an output terminal of the delay assembly of the device, an output signal which is variable with temperature of the display panel; filtering the output signal; converting a filtered output signal into a temperature code; and adjusting a drive voltage outputted to the display panel according to the temperature code.

BRIEF DESCRIPTION OF THE DRAWINGS

In order to more clearly illustrate the technical solution in the embodiments of the present disclosure, the drawings will be briefly described below. It will be apparent that the schematic structure diagrams in the accompanying drawings are not necessary to scale, but rather illustrate characteristics in a simplified form. Further, the drawings in the following description are merely examples of the present disclosure, which are not limitations of the present disclosure.

DETAILED DESCRIPTION

In order to make the objective, the technical solution and advantages of embodiments of the present disclosure clearer, the embodiments of the present disclosure will be described clearly and thoroughly in conjunction with the accompanying drawings. Apparently, the described embodiments are merely part of the embodiments of the present disclosure instead of all of the embodiments. Based on the described embodiments of the present disclosure, all other embodiments obtained by those of ordinary skill in the art without making creative work fall within the protective scope of the present disclosure.

As described above, the embodiments of the present disclosure provide a device and method for temperature detection, a device and method for compensating for temperature of a display panel, and a display device, so as to improve a temperature compensation effect of the display panel. Below, the device and method for temperature detection, the device and method for compensating for temperature of a display panel, and the display device according to the embodiments of the present disclosure will be described in detail by referring to corresponding embodiments.

Figure 1:
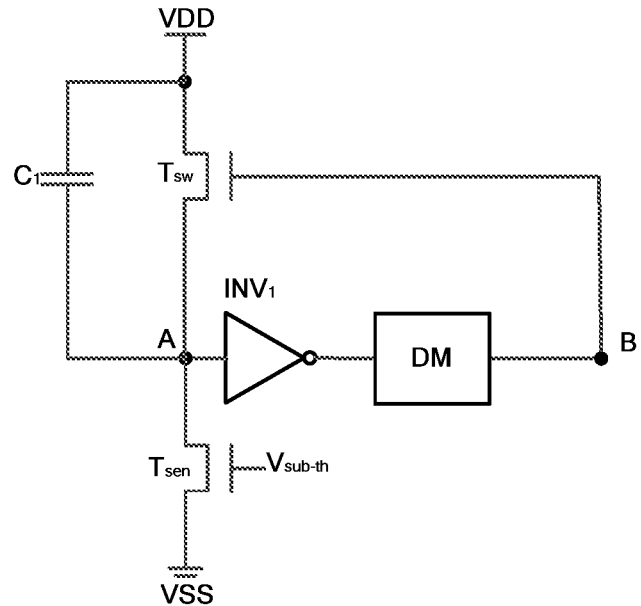
FIG. 1 is a schematic diagram of a device for temperature detection according to an embodiment of the present disclosure.

FIG. 1 is a schematic diagram of a device for temperature detection according to an embodiment of the present disclosure. As shown in FIG. 1, the device for temperature detection includes a first inverter $INV_1$, a delay assembly DM, a switching transistor $T_{sw}$, a first capacitor $C_1$ and a temperature sensing transistor $T_{sen}$.

The first inverter $INV_1$ inverts a voltage signal at an input terminal A thereof and outputs an inverted signal.

The delay assembly DM is coupled to the first inverter $INV_1$, and configured to delay the inverted signal and output a delayed inverted signal as an output signal.

The switching transistor $T_{sw}$ includes a control electrode coupled to an output terminal B (i.e., the output terminal B of the delay assembly DM), a first electrode coupled to a first voltage signal terminal (for example, a working voltage VDD) and a second electrode coupled to the input terminal A of the first inverter $INV_1$. The switching transistor $T_{sw}$ applies the working voltage VDD to the input terminal of the first inverter $INV_1$ based on the output signal. As an example, as shown in FIG. 1, the switching transistor $T_{sw}$ is an N-type transistor.

The first capacitor $C_1$ includes a first terminal coupled to the first electrode of the switching transistor $T_{sw}$ and a second terminal coupled to the input terminal A of the first inverter $INV_1$. The switching transistor $T_{sw}$ and the first capacitor $C_1$ cooperate with the first inverter $INV_1$ and the delay assembly DM to generate an output signal varied periodically, which will be described in detail with reference to FIG. 2 later.

The temperature sensing transistor $T_{sen}$ includes a control electrode applied with a sub-threshold bias voltage (wherein $V_{sub-th}$ is used for representing the sub-threshold bias voltage), a first electrode coupled to the input terminal A of the first inverter $INV_1$ and a second electrode coupled to a second voltage signal terminal (for example, a ground voltage VSS). A channel of the temperature sensing transistor $T_{sen}$ is in a weak inversion state at the sub-threshold bias voltage, and a channel current is monotonically increased with a temperature, and is smaller than a normal bias current. The temperature sensing transistor $T_{sen}$ may be realized by a variety of existing transistors, and may include for example a thin film transistor TFT. As an example, as shown in FIG. 1, the temperature sensing transistor $T_{sen}$ is an N-type transistor.

FIGS. 2A-2F are schematic diagrams of devices for temperature detection according to optional embodiments of the present disclosure.

Figure 2A:
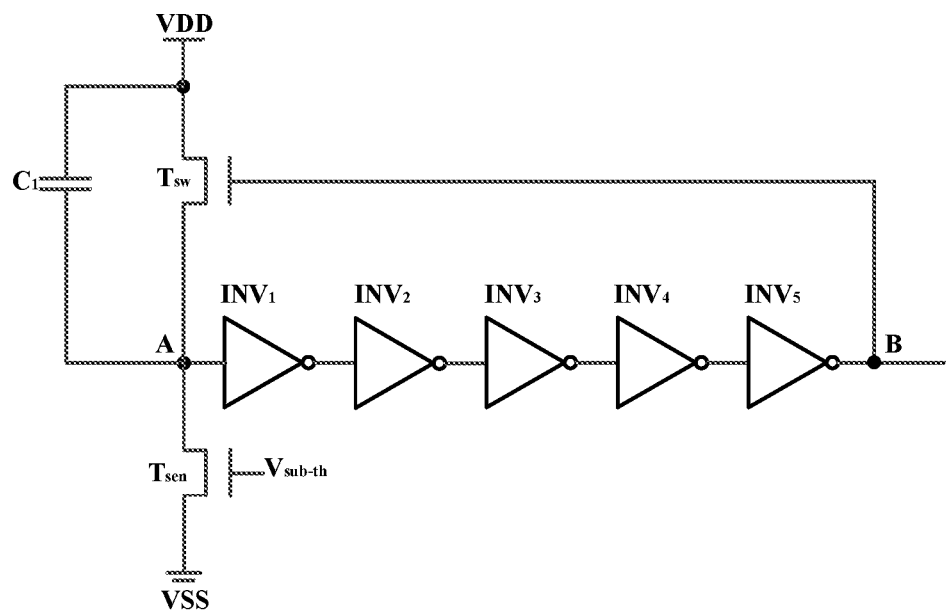
FIGS. 2A, 2B, 2C, 2D, 2E and 2F are schematic diagrams of devices for temperature detection according to embodiments of the present disclosure.

As shown in FIG. 2A, the delay assembly DM shown in FIG. 1 includes inverters $INV_2$, $INV_3$, $INV_4$ and $INV_5$. The structures of the first inverter $INV_1$, the switching transistor $T_{sw}$, the first capacitor $C_1$ and the temperature sensing transistor $T_{sen}$ are the same as those in FIG. 1, which are not repeated.

Any one of the inverters $INV_1$-$INV_5$ may be realized by a variety of existing inverter structures. As an example, any one of the inverters $INV_1$-$INV_5$ may be realized by a complementary metal-oxide-semiconductor (CMOS) inverter, which includes one N-channel metal-oxide semiconductor field-effect transistor (MOSFET) and one P-channel MOSFET. Gates of the two MOSFETs are coupled together as the input terminal of the inverter, and drains of the two MOSFETs are coupled together as the output terminal of the inverter. Source of the P-channel MOSFET is connected to the working voltage VDD, and source of the N-channel MOSFET is connected to the ground VSS.

When the voltage at the input terminal A of the first inverter is at a low level, the output voltage of the first inverter is at a high level, and vice versa. For the four inverters $INV_2$-$INV_5$, which are coupled in series, the output voltage thereof is also at a low level when the input voltage thereof is at a low level, and vice versa. Therefore, a phase of an input signal is not changed, but only a transmission delay (which is a sum of transmission delays of the four inverters) is generated. Thus, the four inverters $INV_2$-$INV_5$ coupled in series may form a delay assembly DM. Accordingly, the five inverters $INV_1$-$INV_5$ coupled in series may be considered as that the first inverter $INV_1$ is coupled to the delay assembly DM.

Figure 2B:
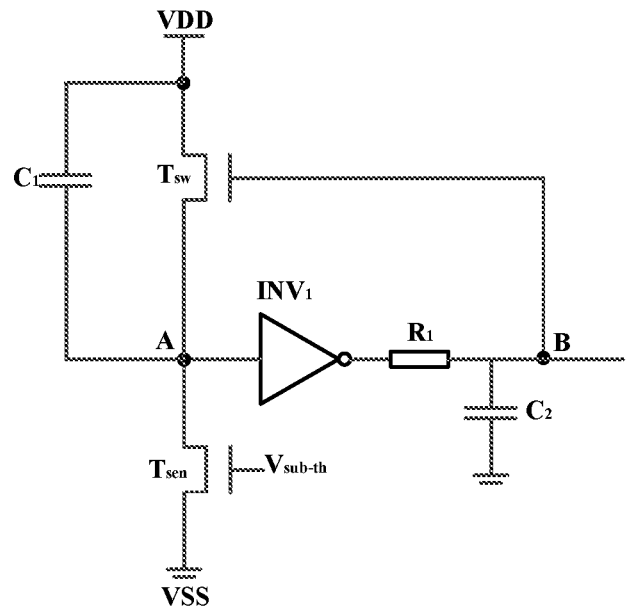

The device for temperature detection of FIG. 2B is substantially the same as that of FIG. 2A, except that the delay assembly DM is an RC delay assembly. As shown in FIG. 2B, in the RC delay assembly, a first terminal of a resistor $R_1$ is coupled to the output terminal of the inverter $INV_1$, and the first terminal is coupled to the output terminal B. A first terminal of a capacitor $C_2$ is coupled to the second terminal of the resistor $R_1$, and a second terminal of the capacitor $C_2$ is grounded. Alternatively, in FIG. 2C, the second terminal of the capacitor $C_2$ is coupled to the input terminal A of the inverter $INV_1$. The second terminal of the resistor $R_1$ is the output terminal B of the RC delay assembly (i.e., the output terminal B of the device for temperature detection). The RC delay assembly may have a delay function similar to that of an even number of inverters coupled in series, and may adjust a period $t_{per}$ of the waveform of the output signal of the output terminal B by adjusting values of the resistor $R_1$ and the capacitor $C_2$, so as to adjust the frequency thereof.

Figure 2C:
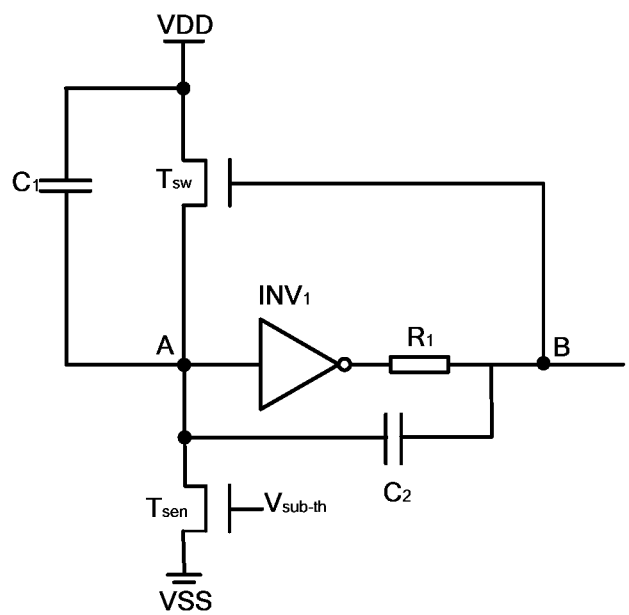
Figure 2D:
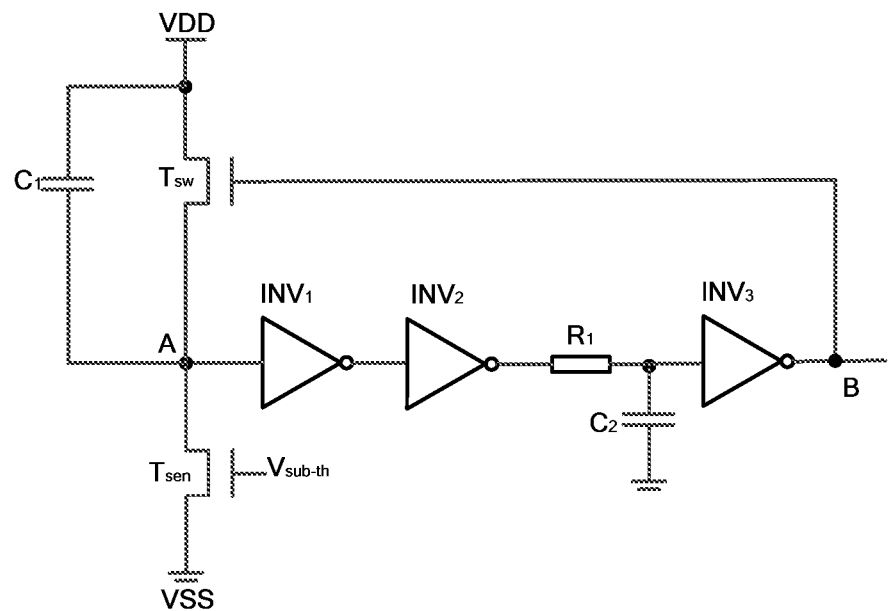
Figure 2E:
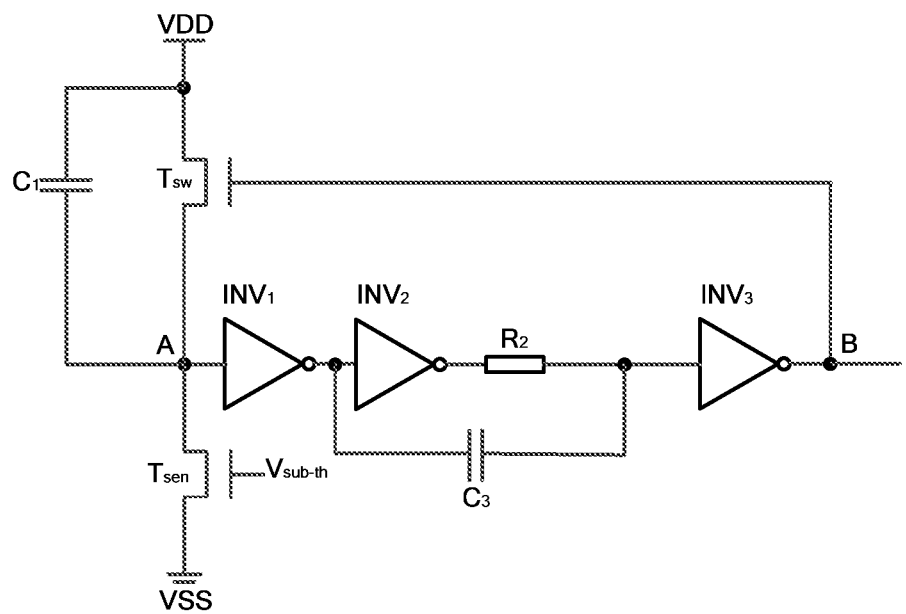

The device for temperature detection of FIG. 2D is substantially the same as that of FIG. 2A, except that the delay assembly includes both an even number of inverter coupled in series and an RC delay assembly. As shown in FIG. 2D, the delay assembly at least includes two inverters $INV_2$ and $INV_3$ coupled in series, a resistor $R_2$, and a capacitor $C_3$. The resistor $R_2$ is disposed in a coupling line between the output terminal of the inverter $INV_2$ and the input terminal of the inverter $INV_3$. The first terminal of the capacitor $C_3$ is coupled to a coupling point between the resistor $R_2$ and the input terminal of the inverter $INV_3$, and the second terminal of the capacitor $C_3$ is coupled to the input terminal of the inverter $INV_2$. Alternatively, in FIG. 2E, the second terminal of the capacitor $C_3$ is grounded. Similarly, it is possible to adjust a period $t_{per}$ of the waveform of the output signal of the output terminal of the device for temperature detection by adjusting values of the resistor $R_2$ and the capacitor $C_3$, so as to adjust the frequency thereof.

Figure 2F:
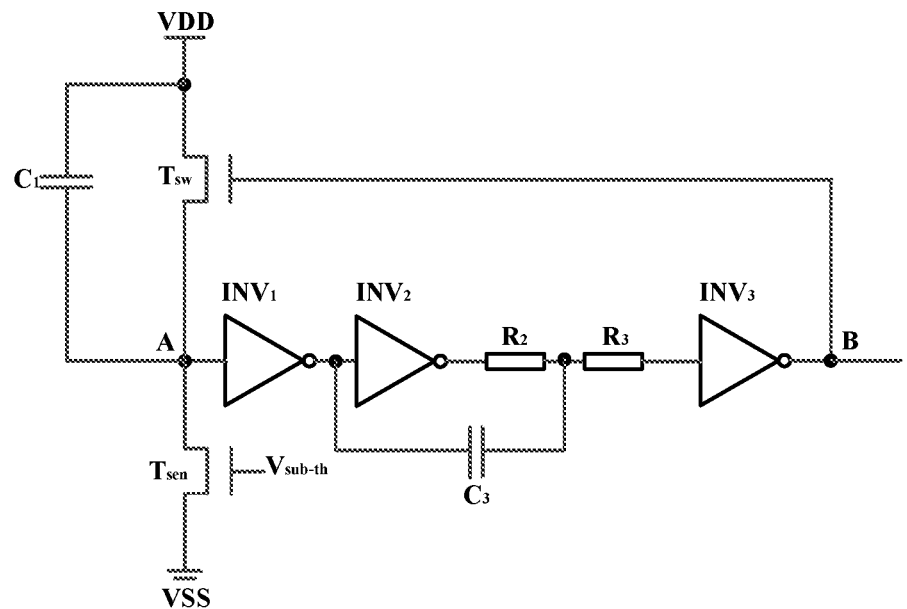

In FIG. 2F, the delay assembly DM may further optionally include a resistor $R_3$ disposed in a coupling line between the resistor $R_2$ and the input terminal of the inverter $INV_3$. The resistor $R_3$ may prevent a current flowing into the inverter $INV_3$ from being excessively large when the voltage at the input terminal of the inverter $INV_3$ undergoes a sudden change, thereby having a protection function.

However, the device for temperature detection of the embodiments of the present disclosure is not limited to the examples described above. First, the delay assembly is not limited to including only four inverters coupled in series as shown in FIG. 2A, and any even number of inverters coupled in series may be included. Next, the RC delay assembly is not limited to only including one resistor and one capacitor as shown in FIGS. 2B-2C, and may include other resistors and/or capacitors to form various structures of RC delay assembly. In addition, the delay assembly is not limited to an even number of inverters coupled in series, an RC delay assembly or combinations thereof, and may also include various other types of delay assemblies.

In addition, it should be noted that, in this context, the term "couple" includes direct and indirect connections between elements.

Figure 3:
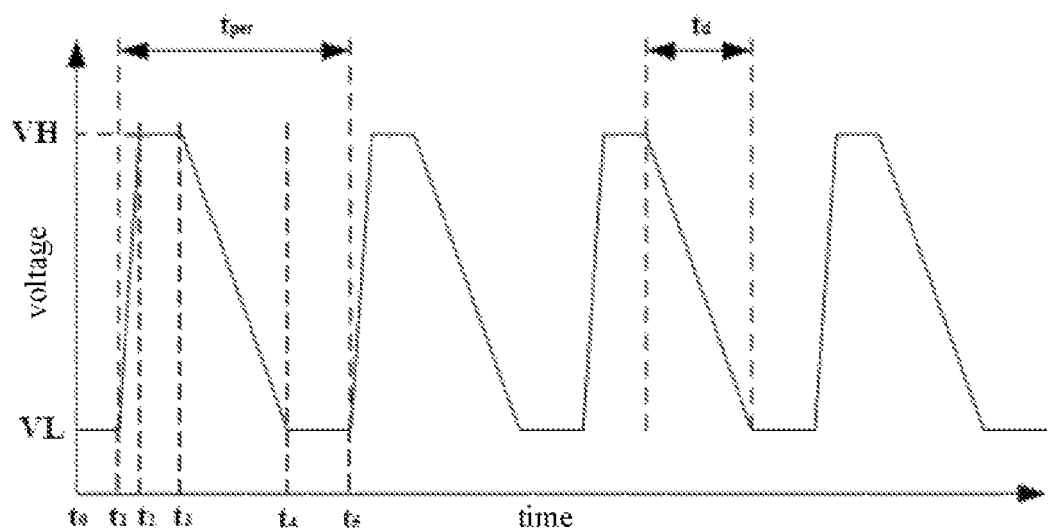
FIG. 3 is a schematic graph of a signal at an input terminal in the device for temperature detection shown in FIG. 2A.

FIG. 3 is a schematic graph of a signal at the input terminal A in the device for temperature detection shown in FIG. 2A.

At time $t_0$-$t_1$, the working voltage VDD is applied to the first electrode of the switching transistor $T_{sw}$, a voltage $V_A$ at the input terminal A of the first inverter $INV_1$ is maintained at a low voltage VL (for example, a low voltage which is close to 0 V), the switching transistor $T_{sw}$ is turned off, and the capacitor $C_1$ is charged. The low voltage VL at the input terminal A is transmitted to the output terminal B of the inverter $INV_5$ (where the time interval between $t_0$ and $t_1$ corresponds to a sum of the delay times of the five inverters $INV_1$ to $INV_5$).

At time $t_1$-$t_2$, the voltage at the output terminal B is a high voltage VH, which is applied to the control electrode of the switching transistor $T_{sw}$ to turn on the switching transistor $T_{sw}$. The voltage $V_A$ at the input terminal A is rapidly pulled from the low voltage VL to the high voltage VH. The capacitor $C_1$ is close to a short-circuit state, and the capacitor $C_1$ is discharged to neutralize accumulated charges on two capacitor plates.

At time $t_2$-$t_3$, the high voltage VH at the input terminal A is transmitted to the output terminal B of the inverter $INV_5$ (where the time interval between $t_2$ and $t_3$ corresponds to the sum of the delay times of the five inverters $INV_1$-$INV_5$). The voltage at the output terminal B is a low voltage VL since there are an odd number of inverters.

At time $t_3$-$t_4$, the low voltage VL at the output terminal B is applied to the control electrode of the switching transistor $T_{sw}$, such that the switching transistor $T_{sw}$ is turned off. Since the switching transistor $T_{sw}$ is turned off, the high voltage VH at the input terminal A is discharged through the temperature sensing transistor $T_{sen}$, so that the voltage $V_A$ at the input terminal A is gradually decreased to the low voltage VL. As the voltage $V_A$ at the input terminal A is gradually decreased, a voltage difference is generated across the capacitor $C_1$, so that the capacitor $C_1$ starts to be charged.

At time $t_4$-$t_5$, the low voltage VL is maintained at the input terminal A and is transmitted to the output terminal B of the inverter $INV_5$ (where the time interval between $t_4$ and $t_5$ corresponds to the sum of the delay times of the five inverters $INV_1$-$INV_5$).

After that, the same process is repeated continuously, resulting in an oscillation waveform shown in FIG. 3. The period $t_{per}$ of the oscillation waveform is the time interval between time $t_1$ and $t_5$, and a discharge time $t_d$ is the time interval between time $t_3$ and $t_4$. It should be noted that the oscillation waveform shown in FIG. 3 is a voltage waveform at the input terminal A, and a waveform of the output signal at the output terminal B of the device for temperature detection may be obtained by inverting the voltage waveform at the input terminal A.

As described above, the temperature sensing transistor $T_{sen}$ is in a sub-threshold state at the voltage $V_{sub-th}$ bias, and the discharge current is relatively small, so that the discharge time $t_d$ between the time $t_3$ and $t_4$ is relatively long. A sub-threshold current of the temperature sensing transistor $T_{sen}$ is monotonically increased with the temperature. When the temperature rises, the discharge current flowing through the temperature sensing transistor $T_{sen}$ increases and the discharge time $t_d$ is shortened, so that the period $t_{per}$ of the waveform outputted by the temperature detection assembly is shortened and the frequency thereof is increased. When the temperature is lowered, the discharge current flowing through the temperature sensing transistor $T_{sen}$ is reduced and the discharge time $t_d$ is increased, so that the period $t_{per}$ of the waveform outputted by the temperature detection assembly becomes long and the frequency thereof decreases. A one-to-one correspondence and a monotonically increasing relationship are established between the waveform frequency of the output signal of the device for temperature detection and the temperature in the screen, and therefore, the frequency of the voltage waveform at the output terminal B of the device for temperature detection may be used to indicate the temperature in the screen.

According to an embodiment of the present disclosure, the device for temperature detection may include a switching transistor, a capacitor, and a basic inverter without the use of a complicated assembly such as an operational amplifier, which facilitates integration in a TFT substrate (e.g., a silicon-based micro-display OLED substrate). In addition, the temperature sensing in the device for temperature detection may be implemented by using the characteristic of a TFT device (e.g., silicon-based CMOS device), that the channel current thereof is monotonically increased with the temperature and is smaller than a normal bias current when the TFT device is at a sub-threshold bias, without other special temperature sensing devices. The device for temperature detection may be fabricated using a TFT process (e.g., a silicon-based CMOS process), which has an excellent compatibility with the process of the TFT array substrate of the display panel. On the other hand, the device for temperature detection may be integrated in any position inside the display panel. The embodiments of the present disclosure may detect a temperature change within a screen better than a device for temperature detection provided outside the display panel or in a drive IC, so that a device for compensating for temperature of a display panel may generate a response more rapidly and accurately.

Figure 4:
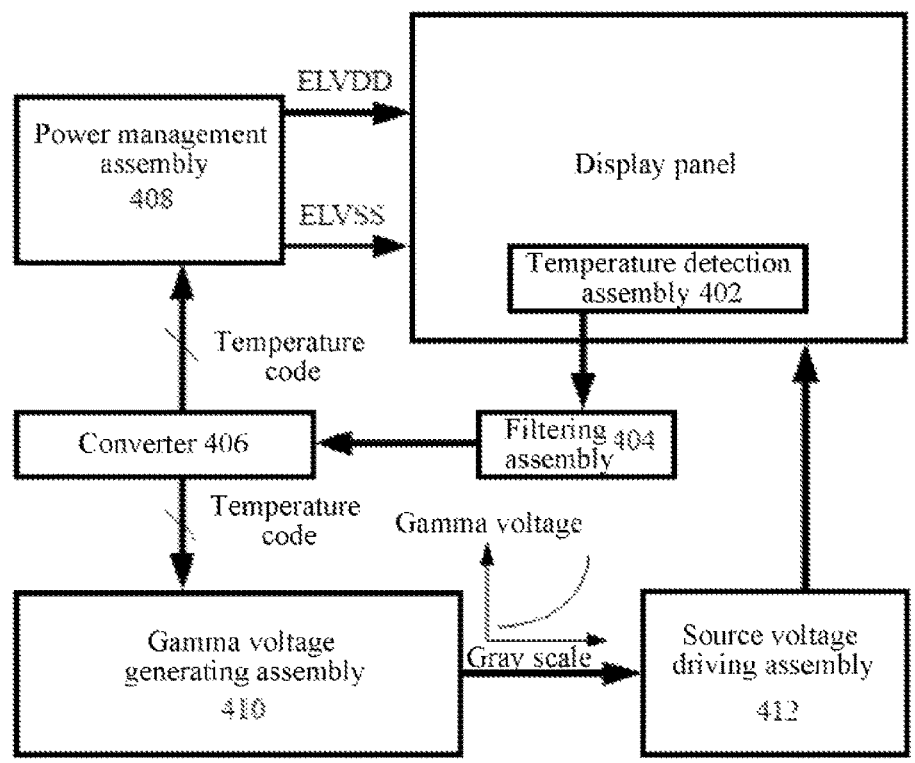
FIG. 4 is a schematic block diagram of a device for compensating for temperature of a display panel according to an embodiment of the present disclosure.

FIG. 4 is a schematic block diagram of a device for compensating for temperature according to an embodiment of the present disclosure. The device may be configured to compensate a display panel (e.g., an LCD display panel, an OLED display panel, etc.) for temperature. As shown in FIG. 4, the device for compensating for temperature at least includes a temperature detection assembly 402, a filtering assembly 404, a converter 406, and a power management assembly 408.

The temperature detection assembly 402 may be realized by the device for temperature detection described above, to output an output signal which varies with the temperature of the display panel. As described above, the temperature detection assembly may be integrated at any position in the display panel (e.g., integrated on an array substrate or a color film substrate of a liquid crystal display panel, integrated on an array substrate or package cover of an OLED display panel, etc.).

The filtering assembly 404 is configured to filter the output signal of the temperature detection assembly 402 to filter out the noise voltage of the output signal. The filtering assembly 404 may be realized by using existing techniques for filtering and shaping signal. As an example, the filtering assembly 404 may include a CMOS buffer.

Figure 5:
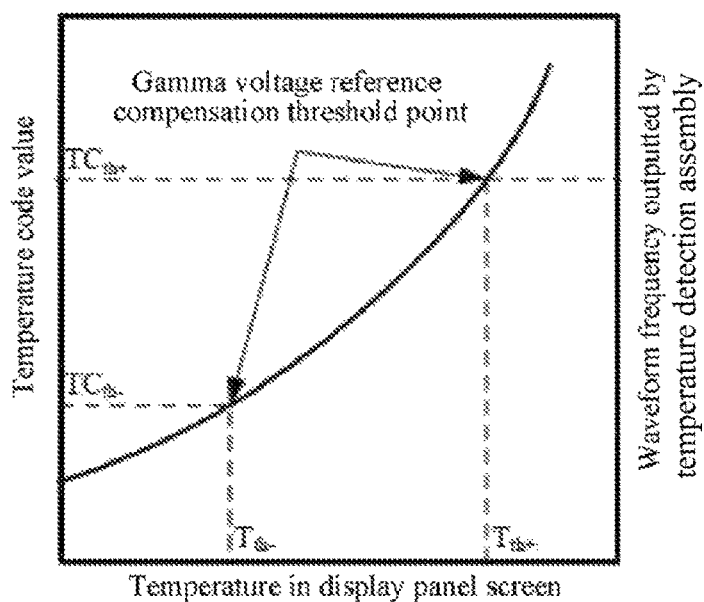
FIG. 5 is a functional relationship graph of a temperature code value and a waveform frequency of an output signal of a device for temperature detection with a temperature change in a display panel screen according to an embodiment of the present disclosure.

The converter 406 may convert a filtered output signal into a temperature code. As an example, the converter 406 is an analog-to-digital converter. The temperature code may be, for example, an N-bit digital code, and there is a one-to-one monotonically increasing relationship between a value of the digital code and the frequency of the oscillating waveform of the output signal of the temperature detection assembly, as shown in FIG. 5. As can be seen from FIG. 5, a temperature code value and the frequency of the oscillating waveform increase monotonically as the temperature in a display panel screen increases. The frequency of the outputted waveform and corresponding temperature code thereto are obtained by using the temperature detection assembly 402 of the embodiment of the present disclosure, and at the same time, the temperature of the display panel is obtained by using other types of existing temperature detection devices, thereby obtaining the functional relationship shown in FIG. 5. As another example, the temperature code may also have a one-to-one monotonically increasing relationship with the period of the oscillation waveform of the temperature detection assembly 402. Since the frequency of the oscillation waveform is monotonically increased with the temperature, the period of the oscillation waveform is monotonically decreased with the temperature. Regardless of whether the temperature code corresponds to the frequency or period of the oscillation waveform, it may be used to indicate the temperature and thus a temperature compensation may be performed.

However, the configuration of the device for compensating the display panel of the embodiment of the present disclosure is not limited thereto, as long as the temperature code indicating the temperature of the display panel may be generated.

The power management assembly 408 adjusts the drive voltage (e.g., ELVDD, ELVSS) outputted to the display panel according to the temperature code, so as to compensate for the temperature of the display panel (for example, by changing a power supply voltage difference of a pixel driving assembly in the display panel to improve the display defect after the drift of the panel temperature). As an example, the power management assembly 408 may include a control part and a direct current to direct current (DC-DC) converter. The control part may generate an adjusted drive voltage value for the display panel according to the temperature code. For example, a curve between the temperature code and the optimal drive voltage of the display panel may be obtained experimentally. The control part may generate the adjusted drive voltage value based on the curve and the current temperature code. The control part may be realized by an application specific integrated circuit (ASIC), a field programmable gate array (FPGA), etc., or a processor chip. The DC-to-DC converter may generate an adjusted drive voltage from, for example, a predetermined voltage according to the adjusted drive voltage value, so as to apply it to the display panel.

According to an embodiment of the present disclosure, optionally, the device for compensating for the temperature of the display panel may further include a Gamma voltage generating assembly 410 and a source voltage driving assembly 412.

The gamma voltage generating assembly 410 is configured to generate a compensated gamma voltage value when the temperature code falls outside the threshold range. As shown in FIG. 5, the threshold range of the temperature code (TC) is [$TC_{th-}$, $TC_{th+}$] corresponding to [$T_{th-}$, $T_{th+}$], where $T_{th-}$ and $T_{th+}$ are the lower temperature limit and the upper temperature limit of a temperature range that does not require a gamma voltage adjustment, respectively, and $TC_{th-}$ and $TC_{th+}$ are the lower limit of the temperature code and the upper limit of the temperature code corresponding to the lower temperature limit and the upper temperature limit, respectively. The lower temperature limit may be determined, for example, by gradually lowering the temperature from a normal working temperature and performing only the compensation adjustment on the drive voltage of the display panel at each temperature, and determining the temperature to be $T_{th-}$ when a deviation between the display effect after the compensation and a desired display effect is just over a predetermined deviation. Similarly, the upper temperature limit may be determined, for example, by gradually elevating the temperature from the normal working temperature and performing only the compensation adjustment on the drive voltage of the display panel at each temperature, and determining the temperature to be $T_{th+}$ when the deviation between the display effect after the compensation and the desired display effect is just over the predetermined deviation.

As an example, the gamma voltage generating assembly 410 may output a gamma voltage curve that matches the current temperature by adjusting a gamma curve reference point to produce a compensated gamma voltage value. The gamma voltage generating assembly 410 may be realized by an application specific integrated circuit (ASIC), a field programmable gate array (FPGA), etc., or may be realized by a processor chip.

The source voltage driving assembly 412 is configured to apply a corresponding gamma voltage to the pixel driving unit of the display panel according to the compensated gamma voltage value, in order to compensate for the brightness and chrominance of the display panel. The source voltage driving assembly may be realized using a variety of existing source driving technologies.

In the embodiments of the present disclosure, the display panel may be compensated according to different temperature ranges. When the temperature fluctuates little, it is possible to compensate for the drift of a display effect with temperature only by adjusting a drive voltage of the display panel without a gamma voltage regulation, which is a more complex operation. When the temperature fluctuates widely, the gamma voltage and the drive voltage of the display may be adjusted simultaneously, so as to better compensate for display problems due to excessively high or low temperature. That is, the device for temperature compensation may directly compensate for, for example, ELVDD and EVLSS, to adjust the display effect of the display panel, when the temperature change is within a certain range. After the certain range is exceeded, the gamma voltage curve is compensated for to adjust the display panel in conjunction with ELVDD and ELVSS.

A display device (e.g., an LCD display device, an OLED display device, etc.) according to an embodiment of the present disclosure includes a display panel and a device for compensating for the temperature of the display panel.

As described above, the device for temperature detection may be integrated at any position in the display panel (e.g., integrated on an array substrate or a color film substrate of a liquid crystal display panel, integrated on an array substrate or package cover of an OLED display panel, etc.). Since the device for compensating for the temperature of a display panel described above is used, the display device may obtain temperature compensation more quickly and more accurately, which will not be repeated.

Figure 6:
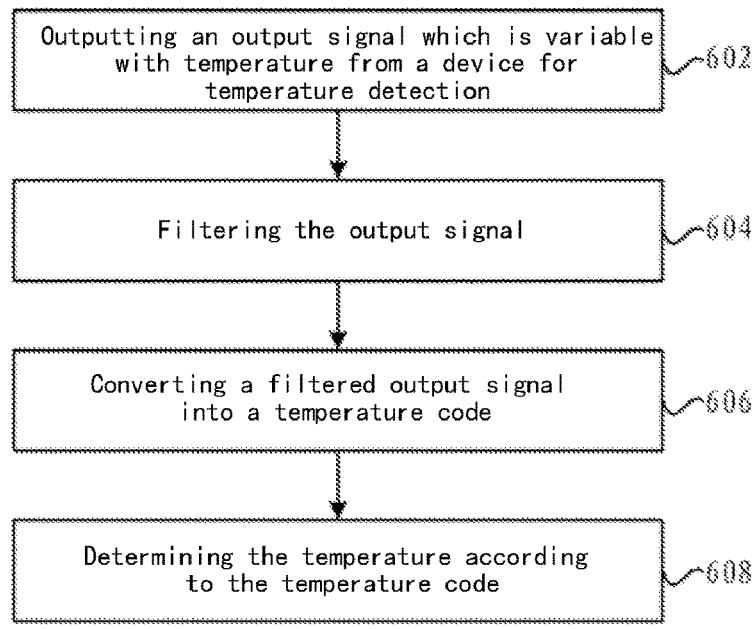
FIG. 6 is a flow chart of a method for temperature detection according to an embodiment of the present disclosure.

FIG. 6 is a flow chart of a method for detecting temperature according to an embodiment of the present disclosure, for example, by using the temperature detection assembly 402 as shown in FIG. 4.

As shown in FIG. 6, in step 602, a high level signal (e.g., a working voltage) is applied to the first voltage signal terminal, a low level signal (e.g., a ground voltage) is applied to the second voltage signal terminal, and a sub-threshold bias voltage is applied to the control electrode of the temperature sensing transistor, so that an output signal, which is varied with temperature, is outputted from the output terminal of the delay assembly.

In step 604, an oscillation waveform of the output signal is filtered, which may be performed by the filtering assembly 404 shown in FIG. 4.

In step 606, the filtered output signal is converted into a temperature code, which may be performed by the converter 406 shown in FIG. 4.

In step 608, a temperature is determined from the temperature code according to a functional relationship between the temperature code and the temperature.

As described above, the temperature code may correspond to the frequency or period of the oscillation waveform. In the case where the temperature code corresponds to the frequency of the oscillation waveform, the temperature code and the temperature have a functional relationship of that the temperature code is monotonically increased with the temperature. In the case where the temperature code corresponds to the period of the oscillation waveform, the temperature code and the temperature have a function relationship of that the temperature code is monotonically decreased with the temperature. These functional relationships may be obtained experimentally as described above.

Figure 7:
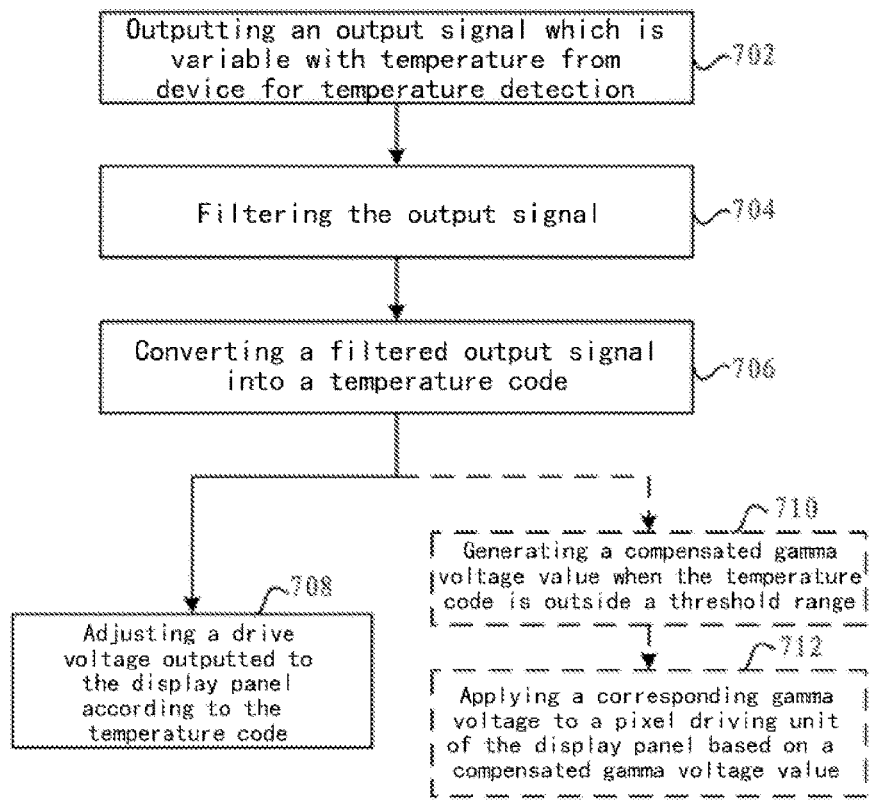
FIG. 7 is a flow chart of a method for compensating for temperature of a display panel according to an embodiment of the present disclosure.

FIG. 7 is a flow chat of a method for compensating for temperature of a display panel according to an embodiment of the present disclosure. The dashed boxes in the figure represent optional steps. The method may be used for temperature compensation of a display panel (e.g., an LCD display panel, an OLED display panel, etc.).

As shown in FIG. 7, in step 702, a high level signal (e.g. a working voltage) is applied to the first voltage signal terminal of the temperature detection assembly 402, a low level signal (e.g., a grounded voltage) is applied to the second voltage signal terminal, and a sub-threshold bias voltage is applied to the control electrode of the temperature sensing transistor, so that an output signal, which is varied with the temperature of the display panel, is outputted from the output terminal of the delay assembly.

In step 704, an oscillation waveform of the output signal is filtered, which may be performed by the filtering assembly 404 shown in FIG. 4.

In step 706, the filtered output signal is converted into a temperature code for temperature compensation, which may be performed by the converter 406 shown in FIG. 4.

In step 708, a drive voltage outputted to the display panel is adjusted according to the temperature code, which may be performed by the power management assembly 408 shown in FIG. 4.

As described above, the method for compensating for the temperature of a display panel of the embodiments of the present disclosure may optionally include steps 710 and 712.

In step 710, when the temperature code is outside the threshold range, a compensated gamma voltage value is generated. For example, after obtaining the temperature code, it may be determined whether the temperature code is outside the threshold range. The compensated gamma voltage value may be generated when it is determined that the temperature code is outside the threshold range. As described above, further, the compensated gamma voltage value may be generated by adjusting a gamma curve reference point. Step 710 may be performed by the gamma voltage generating assembly 410 shown in FIG. 4.

In step 712, a corresponding gamma voltage may be applied to the pixel driving unit of the display panel according to the compensated gamma voltage value, which may be performed by the source voltage driving assembly 412 shown in FIG. 4. Thus, the drift of the display effect with temperature may be adjusted by the compensated power supply voltage of the display panel and the compensated gamma voltage curve, thereby resolving the display problem due to temperature changes in the display panel.

The details of the above steps 702-712 have been described in detail above and will not be repeated herein.

According to the above described embodiments, the device for temperature detection may include a transistor, a resistor, a capacitor and an inverter without other special temperature sensing devices or operational amplifiers, etc., which may simplify the structure of the device and reduce the cost thereof. Further, the device for temperature detection may be integrated into the display panel at any position. The device for temperature detection according to the embodiments of the present disclosure may detect a temperature change within a screen better than a temperature detection assembly provided outside the display panel or in a drive integrated circuit (IC), so that a device for compensating for temperature of a display panel may generate a response more rapidly and accurately. The device for temperature detection may be fabricated using a thin film transistor (TFT) process, thereby improving a process compatibility with a TFT array substrate of the display panel. On the other hand, the display panel may be compensated according to different temperature ranges. When the temperature fluctuates little, it is possible to compensate for the drift of a display effect with temperature only by adjusting a drive voltage of the display panel without a gamma voltage regulation, which is a more complex operation. When the temperature fluctuates widely, the gamma voltage and the drive voltage of the display panel may be adjusted simultaneously, so as to better compensate for display problems due to excessively high or low temperature.

It should be noted that the above embodiments are merely exemplary embodiments of the present disclosure and are not intended to limit the scope of the present disclosure, which is defined by the appended claims.

What is claimed is:

1. A device for temperature detection, comprising:
a first inverter, configured to invert a voltage signal at an input terminal of the first inverter to output an inverted signal;
a delay assembly, coupled to the first inverter, and configured to delay the inverted signal and to output a delayed inverted signal as an output signal;
a switching transistor, comprising a control electrode coupled to the delay assembly, a first electrode coupled to a first voltage signal terminal and a second electrode coupled to the input terminal of the first inverter, and configured to apply a first voltage signal from the first voltage signal terminal to the input terminal of the first inverter based on the output signal;
a first capacitor, comprising a first terminal coupled to the first electrode of the switching transistor and a second terminal coupled to the input terminal of the first inverter; and
a temperature sensing transistor, comprising a control electrode applied with a sub-threshold bias voltage, a first electrode coupled to the input terminal of the first inverter and a second electrode coupled to a second voltage signal terminal, and configured so that a channel current of the temperature sensing transistor is proportional to a temperature at the sub-threshold bias voltage.

2. A device for compensating for temperature of a display panel, comprising:
the device for temperature detection according to claim 1;
a filtering assembly, configured to filter an output signal of the device for temperature detection;
a converter, configured to convert a filtered output signal into a temperature code; and
a power management assembly configured to adjust a drive voltage outputted to the display panel according to the temperature code.

3. A display device, comprising:
a display panel; and
the device for compensating for temperature of a display panel according to claim 2.

4. The display device according to claim 3, wherein the device for temperature detection is disposed in the display panel.

5. The display device according to claim 3, wherein the delay assembly comprises an even number of inverters coupled in series.

6. The display device according to claim 3, wherein the delay assembly comprises:
a first resistor, comprising a first terminal coupled to an output terminal of the first inverter and a second terminal as an output terminal of the delay assembly; and
a second capacitor, comprising a first terminal coupled to the second terminal of the first resistor and a second terminal coupled to the second voltage signal terminal.

7. The display device according to claim 3, wherein the delay assembly comprises:
a first resistor, comprising a first terminal coupled to an output terminal of the first inverter and a second terminal as an output terminal of the delay assembly; and
a second capacitor, comprising a first terminal coupled to the second terminal of the first resistor and a second terminal coupled to the input terminal of the first inverter.

8. The device for compensating for temperature of a display panel according to claim 2, further comprising:
a gamma voltage generating assembly, configured to generate a compensated gamma voltage value when the temperature code is outside a threshold range; and
a source voltage driving assembly, configured to apply a corresponding gamma voltage to a pixel driving unit of the display panel based on a compensated gamma voltage value.

9. The device for compensating for temperature of a display panel according to claim 8, wherein the gamma voltage generating assembly generates the compensated gamma voltage value by adjusting a gamma curve reference point.

10. The device for compensating for temperature of a display panel according to claim 2, wherein the delay assembly comprises an even number of inverters coupled in series.

11. The device for compensating for temperature of a display panel according to claim 2, wherein the delay assembly comprises:
a first resistor, comprising a first terminal coupled to an output terminal of the first inverter and a second terminal as an output terminal of the delay assembly; and
a second capacitor, comprising a first terminal coupled to the second terminal of the first resistor and a second terminal coupled to the second voltage signal terminal.

12. The device for compensating for temperature of a display panel according to claim 2, wherein the delay assembly comprises:
a first resistor, comprising a first terminal coupled to an output terminal of the first inverter and a second terminal as an output terminal of the delay assembly; and
a second capacitor, comprising a first terminal coupled to the second terminal of the first resistor and a second terminal coupled to the input terminal of the first inverter.

13. The device for temperature detection according to claim 1, wherein the delay assembly comprises an even number of inverters coupled in series.

14. The device for temperature detection according to claim 13, wherein the even number of inverters coupled in series comprises a second inverter and a third inverter adjacent to each other, and
the delay assembly further comprises:
a second resistor, comprising a first terminal coupled to an output terminal of the second inverter and a second terminal coupled to an input terminal of the third inverter; and
a third capacitor, comprising a first terminal coupled to the second terminal of the second resistor and a second terminal coupled to the second voltage signal terminal.

15. The device for temperature detection according to claim 14, wherein the delay assembly further comprises a third resistor, comprising a first terminal coupled to the second terminal of the second resistor and a second terminal coupled to the input terminal of the third inverter.

16. The device for temperature detection according to claim 13, wherein the even number of inverters coupled in series comprise a second inverter and a third inverter adjacent to each other, and
the delay assembly further comprises:
a second resistor, comprising a first terminal coupled to an output terminal of the second inverter and a second terminal coupled to an input terminal of the third inverter; and
a third capacitor, comprising a first terminal coupled to the second terminal of the second resistor and a second terminal coupled to an input terminal of the second inverter.

17. The device for temperature detection according to claim 16, wherein the delay assembly further comprises a third resistor, comprising a first terminal coupled to the second terminal of the second resistor and a second terminal coupled to the input terminal of the third inverter.

18. The device for temperature detection according to claim 1, wherein the delay assembly comprises:
a first resistor, comprising a first terminal coupled to an output terminal of the first inverter and a second terminal as an output terminal of the delay assembly; and
a second capacitor, comprising a first terminal coupled to the second terminal of the first resistor and a second terminal coupled to the second voltage signal terminal.

19. The device for temperature detection according to claim 1, wherein the delay assembly comprises:
a first resistor, comprising a first terminal coupled to an output terminal of the first inverter and a second terminal as an output terminal of the delay assembly; and
a second capacitor, comprising a first terminal coupled to the second terminal of the first resistor and a second terminal coupled to the input terminal of the first inverter.

20. The device for temperature detection according to claim 1, wherein the temperature sensing transistor comprises a thin film transistor.

\* \* \* \* \*